United States Patent [19]

Fecik et al.

[11] Patent Number: 4,470,835
[45] Date of Patent: Sep. 11, 1984

[54] SHAPING SHEETS OF GLASS OR OTHER DEFORMABLE MATERIAL TO A COMPLICATED CURVATURE

[75] Inventors: Michael T. Fecik, Pittsburgh; Robert G. Frank, Murrysville; John J. Ewing, Tarentum; George R. Claassen, New Kensington, all of Pa.

[73] Assignee: PPG Industries, Inc., Pittsburgh, Pa.

[21] Appl. No.: 441,345

[22] Filed: Nov. 15, 1982

[51] Int. Cl.³ .................................. C03B 23/03
[52] U.S. Cl. .................................... 65/106; 65/104; 65/273; 65/291
[58] Field of Search ............... 65/104, 106, 107, 114, 65/115, 273, 291, 351

[56] References Cited

U.S. PATENT DOCUMENTS

| 4,197,108 | 4/1980 | Frank et al. | 65/273 |
| 4,272,274 | 6/1981 | Frank et al. | 65/273 |
| 4,277,276 | 7/1981 | Kellar et al. | 65/106 |
| 4,297,118 | 10/1981 | Kellar et al. | 65/104 |
| 4,349,375 | 9/1982 | Kellar et al. | 65/291 |

*Primary Examiner*—Arthur D. Kellogg
*Attorney, Agent, or Firm*—Donald Carl Lepiane; Edward I. Mates

[57] ABSTRACT

A deformable vacuum mold for shaping glass sheets to complicated shapes includes mold stiffening structure engaging the central portion of the mold, mold lifting means engaging the longitudinal end portions of the vacuum mold to lift the latter relative to the mold stiffening structure and optional bar means adjustable in position and orientation to provide local control imparted to the shape of the vacuum mold when the longitudinal end portions of the mold are lifted. The deformable vacuum mold may also include a pair of lifting means providing different amounts of lift to the longitudinal end portions on opposite sides of the longitudinal center line of the mold and approximately equal amounts of lift to the longitudinal end portions on opposite sides of the transverse center line of the mold.

13 Claims, 4 Drawing Figures

SHAPING SHEETS OF GLASS OR OTHER DEFORMABLE MATERIAL TO A COMPLICATED CURVATURE

BACKGROUND OF THE INVENTION

1. Field of the Invention

The present invention relates to the shaping of sheets of deformable material such as glass using a deformable vacuum mold of novel construction. More particularly, the present invention relates to the shaping of glass sheets to a complicated bend having opposite longitudinal sides bent to different shapes simultaneously while a sheet undergoing bending is in contact with a deformable vacuum mold. Most particularly, the present invention relates to a novel construction of means to distort a deformable vacuum mold used to shape sheets of deformable material to complicated shapes.

2. Description of Patents of Interest

U.S. Pat. No. 4,277,276; U.S. Pat. No. 4,297,118 and U.S. Pat. No. 4,349,375, all to John D. Kellar and Gordon F. Pereman, disclose the bending of glass sheets while supported in engagement against a deformable vacuum mold. In these patents, a hot, flat glass sheet is brought into engagement against a lower wall of a vacuum mold that is apertured so that air can be sucked in through the apertures of the lower wall to hold a flat glass sheet in engagement against the lower wall. Means is provided to deform the vacuum mold and shape its lower wall to a shape corresponding to that desired for a bent glass sheet. The glass sheet is softened sufficiently prior to its vacuum engagement against the lower wall of the vacuum mold so that when the mold deforms, the sheet supported thereagainst by vacuum also deforms. In the first two patents, elongated beams with curved lower edges are provided to guide the shape developed by distorting the vacuum mold. These beams require replacement to enable the apparatus to conform the deformable mold to a different production pattern. The third patent deforms the vacuum mold by a linkage arrangement that develops a series of bends of gradually increasing departure from a flat configuration toward the opposite longitudinal ends.

When continuous cams are used to engage the distorting vacuum mold, their ability to control the distortion of the deformable vacuum mold must be adjusted exactly at the beginning of a campaign for a particular pattern. It is very difficult to adjust the shape of improperly shaped cams that engage the upper wall of the vacuum mold. Since it is necessary to match the shape of the glass periphery to the outline shape of a mounting frame of a vehicle to which the bent glass sheet is bonded during fabrication of a vehicle or during replacement of a damaged window with a replacement window, the present invention has found it easier to obtain conformance of the bent glass sheet to a pattern when the shape of the deformable vacuum mold is further controlled by means other than the continuous cams of the prior art, which are not amenable to modification once their mold guiding shape is established.

U.S. Pat. Nos. 4,197,108 and 4,272,274 to Frank et al. disclose apparatus for bending glass sheets into cylindrical bends wherein glass sheets are conveyed into a shaping station on conveyor rolls and are lifted on a grooved shaping mold having a plurality of spaced elongated shaping members extending completely across a dimension of the shaping apparatus. The shaping members are separated by grooves that extend completely across the dimension of the mold, so that when the grooved shaping mold is lifted from a position beneath the conveyor rolls to a position above the conveyor rolls, the lifted glass sheet immediately above the mold sags by gravity to conform to the shape of the elongated shaping areas between the continuous elongated grooved portions. The glass is lifted into vacuum engagement against a downwardly facing wall of an upper vacuum mold having a downwardly facing wall of desired fixed configuration, the lower lifting mold is lowered to below the level of the conveyor rolls and a ring-like member is transported into the shaping station below the upper vacuum mold and above the conveyor rolls to enable the shaped glass sheet to be transferred by releasing the vacuum that supports the bent glass sheet against the lower wall of the upper vacuum mold. Preferably, the upper vacuum mold is moved vertically to a position near the conveyor rolls initially to minimize the lifting required for the lower mold, and then the vacuum mold is lifted while the lifting mold is lowered after the upper vacuum mold engages the rising glass sheet by vacuum.

In both types of apparatus described previously, the glass has been limited in its shaping to a relatively easy to accomplish shape about one axis of curvature. The need for more complicated shapes made it necessary for the glass sheet bending art to improve on the apparatus existing at the time of the present invention.

SUMMARY OF THE INVENTION

The present invention comprises a deformable vacuum mold having mold deforming means to distort the opposite sides of said mold to different degrees to develop a complicated curvature conforming approximately to that desired for a glass sheet bent to said complicated curvature. The vacuum mold has the capability of distorting relatively slightly along its relatively short transverse dimension and capable of greater deformation along its relatively long longitudinal dimension between a flat and curved longitudinal bending component in response to actuation by said mold deforming means. The glass-facing surface of the vacuum mold is relaxed when it defines a flat longitudinal component and stressed when deformed to a curved longitudinal component. The deformable vacuum mold of one embodiment of the present invention includes a plurality of reinforcing elements in the form of rigid bars extending across the width of the mold between intermediate mold stiffening structure and the ends of the mold and means to lift the mold end portions above the stiffening structure to distort the mold. The rigid bars are located outside the mold for easy access to adjust their vertical and horizontal positions and their orientations to control the shape of the distorted mold locally. The mold end lifting means may be constructed and arranged to lift points near the sides of the deformable mold different distances on opposite sides of the longitudinal center line of the mold and equal distances for corresponding points near the ends of the mold on opposite sides of the transverse center line of the mold.

A flat glass sheet arriving at an elevated temperature suitable for shaping at the shaping station is lifted either on flat lifting members or on members gently shaped to a transverse component of curvature while lifted to the vicinity of the vacuum mold and then is engaged by vacuum when in close adjacency to the lower wall of the vacuum mold, which may be either flat or transversely curved when the latter is in its relaxed state. A glass sheet, on engaging the vacuum mold with its lower wall either flat or shaped in one direction to the corresponding transversely flat or curved dimension of the vacuum mold, approximates one component of its ultimate shape but extends in essentially straight longitudinal line elements in the direction to be shaped to conform to the other component of the desired compound bend. Alternatively, the glass sheet may be engaged by lowering a vertically movable, deformable vacuum mold that is flat when it is close to the glass sheet. After the glass sheet is brought into close proximity to the vacuum mold, or vice versa, vacuum is continued to hold the glass sheet against the relaxed vacuum mold. The vacuum mold is then distorted to different degrees of shaping along its longitudinal dimension on opposite sides of its longitudinal center line while maintaining the vacuum so that the heat-softened glass sheet follows the changing shape of the deformable mold in a manner similar to that provided for shaping flat sheets to more simple shapes by the distortable vacuum molds of the prior art. The result is the obtention of glass sheets having complicated shapes not previously obtainable with distortable prior art vacuum molds.

A preferred embodiment of deformable vacuum mold is supported in its central portion against mold stiffening structure extending across the upper surface of the mold and is deformed by a pair of deforming means, such as oppositely acting pistons, that apply lifting force to the end portions of said vacuum mold through cable means to distort the vacuum mold longitudinally on opposite sides of its longitudinal center line by different amounts while applying symmetrical action to each longitudinal half on opposite sides of its transverse center line. One or more transverse bars are supported exterior to the mold against the upper surface of the deformable vacuum mold between the stiffening means and the points of application of the upward lifting force. The positions and orientation of the bars are readily adjustable to control local variations in the shape imparted to said deformable vacuum mold between its central portion and its longitudinal end portions.

In a preferred embodiment of the present invention to produce complicated compound bends, the transversely curved, longitudinally distortable vacuum mold is used with a slotted lifting mold that moves vertically between a lowered position beneath the sheet support surface of a sheet transporting roll conveyor and an upper position in close proximity to the deformable vacuum mold which deforms as it lifts the hot glass sheet to generate a complicated glass sheet shape. The lifting mold separates from the vacuum mold to provide space for a ring-like member to receive the shaped glass sheet and transfer the latter while supported thereon to a cooling station where the glass sheet is chilled as rapidly as is necessary to impart a desired degree of temper in the glass. However, the present invention is also useful when the deformable vacuum mold is vertically movable between a lower position relaxed to a flat configuration for engaging a hot glass sheet by vacuum and an upper position stressed to a distorted shape desired for release upon the ring-like member of suitable outline shape that shuttles the hot glass sheet to the cooling station.

The benefits of the present invention will be understood more clearly in the light of a description of a specific embodiment that follows. The term "glass" is used for convenience only and is intended to cover any deformable, transparent material.

BRIEF DESCRIPTION OF THE DRAWINGS

In the drawings that form part of the description of an illustrative embodiment.

DESCRIPTION OF A PREFERRED EMBODIMENT

Figure 1:
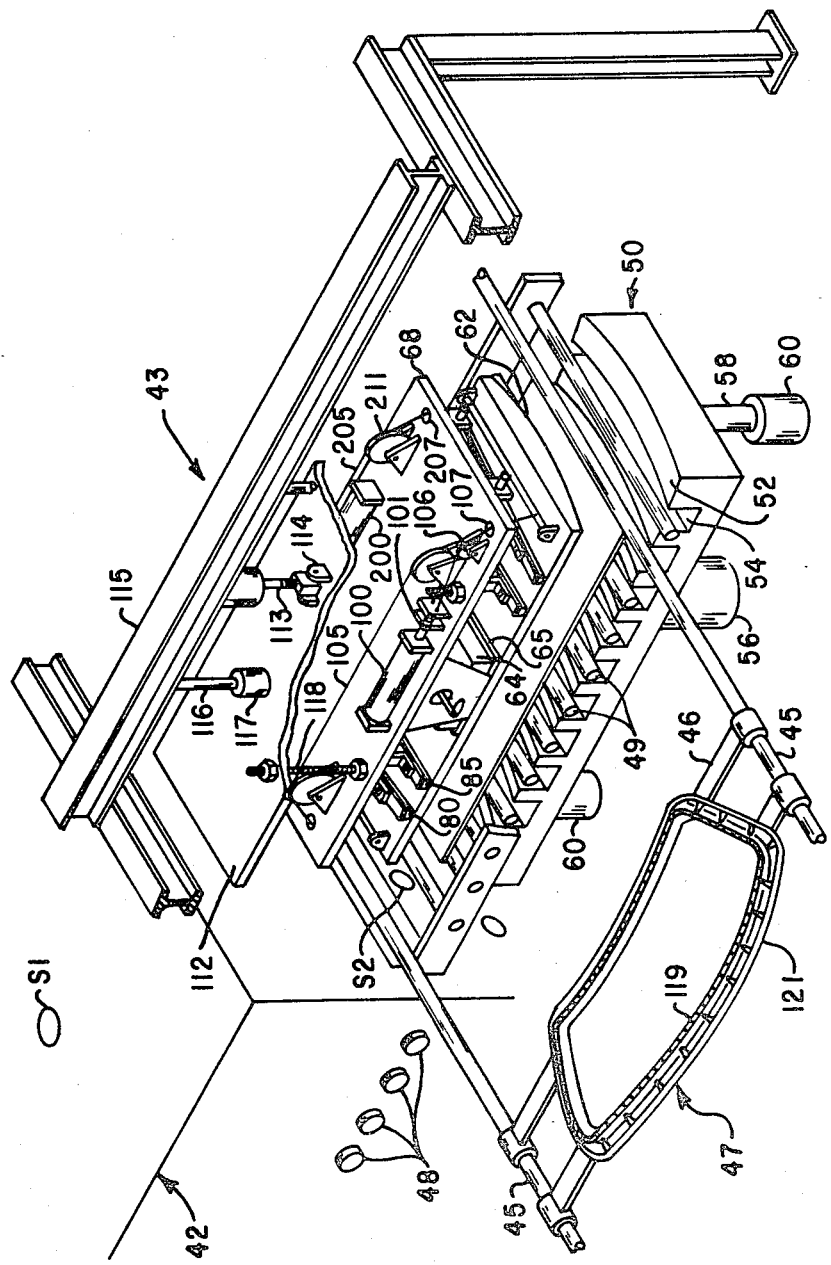
FIG. 1 is a perspective view of apparatus for shaping glass sheets that incorporates a preferred embodiment of the present invention comprising a shaping station having a vacuum mold having a deformable longitudinal shape shown in combination with means for distorting said vacuum mold to different degrees longitudinally on opposite sides of its longitudinal center line and incorporates a symmetrical bend about its transverse center line.

Referring now to FIG. 1 of the drawings, an apparatus for heating and shaping sheets of material, such as glass, includes a heating means such as a tunnel-like furnace 42, the exit end of which is shown, a shaping station 43 located immediately beyond the exit of the furnace 42 and a cooling station (not shown) located to one side of the shaping station 43. The apparatus also includes a pair of transversely extending rails 45 which are used to transport a carriage 46 to which is attached a sheet transfer means 47 to shuttle the latter between the shaping station 43 and the cooling station.

Heat may be supplied in the furnace 42 by hot gases from gas burners or by electric radiant heating elements or by a combination of both. These heat supply means are well known in the art and need not be described in further detail at this stage of the development of the art.

The side walls of the furnace support bearing housings for a roller-type conveyor comprising longitudinally spaced, transversely extending conveyor rolls 48 that define a horizontal path of travel which extends through the furnace 42. Additional conveyor rolls 49 are located at the shaping station 43 to form a continuation of the path of travel of rolls 48 beyond the furnace 42. The rolls of the conveyor are arranged in sections and their rotational speed controlled through clutches in a manner well known in the art so that the speed of the different conveyor sections may be controlled and synchronized. A glass sheet sensing element S1 is located a short distance upstream of the shaping station 43 to actuate a high speed runout of conveyor rolls 48 near the furance exit. A second sensing element 52 is located just beyond the furnace exit to initiate a cycle of operation of this apparatus.

Limit switches or electronic controllers or other timing devices may be provided to synchronize the operation of the various elements of the apparatus according to a predetermined sequence. Since their arrangement and manner of operation are not limiting to this invention and any convenient type may be used, they will not be described in detail herein.

A lifting mold 50 comprising a plurality of transversely extending shaping members 52 spaced by transversely extending slots 54 is actuated for vertical movement by a lower piston 56 and controlled in its vertical movement by vertical guides 58 mounted in sleeves 60. Both the shaping members 52 and the slots 54 extend across the entire transverse dimension of the lifting mold 50.

The conveyor rolls 48 and 49 extend across the transverse dimension of the conveyor so as to support the entire transverse dimension of a glass sheet along closely spaced lines of rolling support to maintain a desired degree of flatness in the glass sheet on its arrival at the shaping station 43. The transverse slots 54 extend across the entire width dimension of the lifting mold 50 and are of a size sufficient to have clearance for moving the elongated transversely extending shaping members 52 from a lowered position below conveyor rolls 49 to an elevated position above the conveyor rolls 49, wherein the latter are encompassed within the transversely extending slots 54.

The glass sheets are supported across their entire width first on conveyor rolls 48 during their passage through the furnace and then on conveyor rolls 49 as they enter the shaping station 43. When the lifting mold 50 is raised, the glass sheet is lifted from conveyor rolls 49 and sags onto the shaping members 52, which support the lifted glass sheet across its entire width.

Directly above the lifting mold 50 is a deformable vacuum mold 62, similar to the type depicted in U.S. Pat. No. 4,349,375 to John D. Kellar and Gordon F. Pereman, the disclosure of which is incorporated herein by reference. The latter comprises an upper flexible sheet adapted for coupling to a vacuum source and a lower flexible sheet coextensive in area and apertured to apply vacuum to engage a glass sheet thereagainst, with flexible spacer means in the form of flexible, open-work plates slidably interposed between the upper and lower flexible sheets. The flexible spacer means prevent the deformable vacuum mold 62 from collapsing yet allows the volume enclosed within mold 62 to transmit suction through the apertured lower walls of the mold. The vacuum mold 62 communicates with a common vacuum supply box 64. The latter is selectively connected to a vacuum source (not shown) through a flexible supply line 66 (see FIG. 4). The flexible supply line may communicate with a pressure source selectively instead of the vacuum source by interposing selective valve means between the common vacuum supply box 64 and the pressure source and/or the vacuum source in a manner well known in the art so that either vacuum or pressure may be selectively applied to the common vacuum supply box 64. The latter is attached to the upper wall of the vacuum mold 62 by stiffening structure 65 that extends across the width of mold 62 to stiffen the central portion thereof without affecting the distortability of the outer portions of the vacuum mold 62.

The common vacuum supply box 64 communicates with the interior of the deformable vacuum mold 62 in the manner depicted in U.S. Pat. No. 4,349,375 to John D. Kellar and Gordon F. Pereman. The details of the construction and arrangement of the interior of the deformable vacuum mold interior and of its vacuum supply box contained in this patent are not limiting to the present invention although they may be incorporated in a deformable vacuum mold having means conforming to the present invention to distort the deformable vacuum molds to more complicated shapes than previously.

The present description will concentrate on the details of adjustable structural reinforcements that cooperate with means applying distorting force to the deformable vacuum mold that facilitate the change in shape of the vacuum mold from an unstressed shape to a selected one of several complicated distorted shapes that can be obtained by simple adjustment of certain readily accessible structural elements of the present invention. In other words, the present invention may be used with a deformable vacuum mold having any interior construction that provides flexibility and avoids collapse of the vacuum mold when vacuum is applied.

The means for distorting the deformable vacuum mold 62 comprises a reinforcement plate 68 (FIGS. 1 and 2) rigidly secured in spaced relation above the central portion of the longitudinal side edge portions of the upper flexible wall of the deformable vacuum mold 62 through keystone shaped plates 69. The latter cooperate with the mold stiffening structure 65 to stiffen the vacuum mold 62 across its width in its longitudinally central portion. The spaces between the reinforcement plate 68 and the deformable vacuum mold 62 that flank the mold stiffening structure are open to facilitate access to adjust the positions and orientation of rigid bars that reinforce the deformable vacuum mold to control the deformed shape of the mold in a manner to be described later.

A pair of threaded shafts 70 (FIGS. 2 and 4) extend longitudinally from a gear box 71. The latter is fixed securely to the bottom surface of the reinforcement plate 68 intermediate the keystone shaped plates 69. A crank shaft 72 operated by a readily accessible crank 73 actuates rotation of the threaded shafts 70. Each threaded shaft 70 is operatively connected at its longitudinally outer end portion with a transversely extending housing 74 to promote longitudinal adjustment of each said housing relative to the length of said deformable vacuum mold 62.

A pair of shafts 75 extend longitudinally in flanking relation and in vertically offset relation to each threaded shaft 70. Shafts 75 are suspended in rigid attachment to the bottom of the reinforcing plate 68 through eye members 76 that are rigidly attached to said reinforcing plate.

Each housing 74 is provided with a pair of sleeves 77 (FIG. 2) on its upper wall. The sleeves 77 are slidably supported on corresponding shafts 75. Each housing 74 has a pair of outer vertically slotted members 78 that have arcuately slotted outer horizontal flanges 79 extending transversely outward therefrom. A transverse rigid outer bar 80 is adjustably fixed at spaced points along bar 80 to corresponding outer flanges 79 to engage a corresponding arcuate slot on the outer arcuately slotted flange 79 to adjust the orientation of each transverse rigid outer bar 80. The vertically slotted members 78 are vertically adjustable relative to each transverse end portion of transverse housing 74 to establish the vertical positions at the ends of the rigid outer bars 80. The latter extend below and between the horizontal flanges 79 so that their longitudinal positions depend on those of housing 74, their vertical positions on the adjustment of vertically slotted members 78 and their orientation on their positioning relative to the arcuate slots of arcuately slotted horizontal flanges 79.

A horizontally slotted member 81 is adjustably fixed relative to each transverse end portion of transverse housing 74. An oblique extension member 82 is fixed at its outer end to the longitudinally inner end of each horizontally slotted member 81 and supports an inner vertically slotted member 83. Each inner vertically slotted member 83 has an arcuately slotted horizontal flange 84 (FIGS. 2 and 4) to which is adjustably fixed an inner rigid bar 85. The position of said inner bar 85 is determined by the setting of the horizontally slotted member 81 and the setting of the inner vertically slotted member 83 associated therewith. The orientation of each inner bar 85 is based on its positioning relative to the associated arcuately slotted, horizontal inner flanges 84. A lock nut and a threaded shaft is provided for each slot in readily accessible positions in open space between the reinforcement plate 68 and the deformable vacuum mold 62 to facilitate releasing and tightening of said lock nuts relative to said threaded shafts to adjust the positions and orientations of the outer rigid bars 80 and inner rigid bars 85.

The structural elements 78 to 85 cooperate with elements 70 to 77 to provide means to adjust the vertical and horizontal positions of rigid outer bars 80 and rigid inner bars 85. The rigid outer bars 80 and rigid inner bars 85 are adjusted to occupy positions desired for corresponding portions of the vacuum mold 62 to engage thereagainst when the latter is distorted by lifting its longitudinal end portions.

Figure 3:
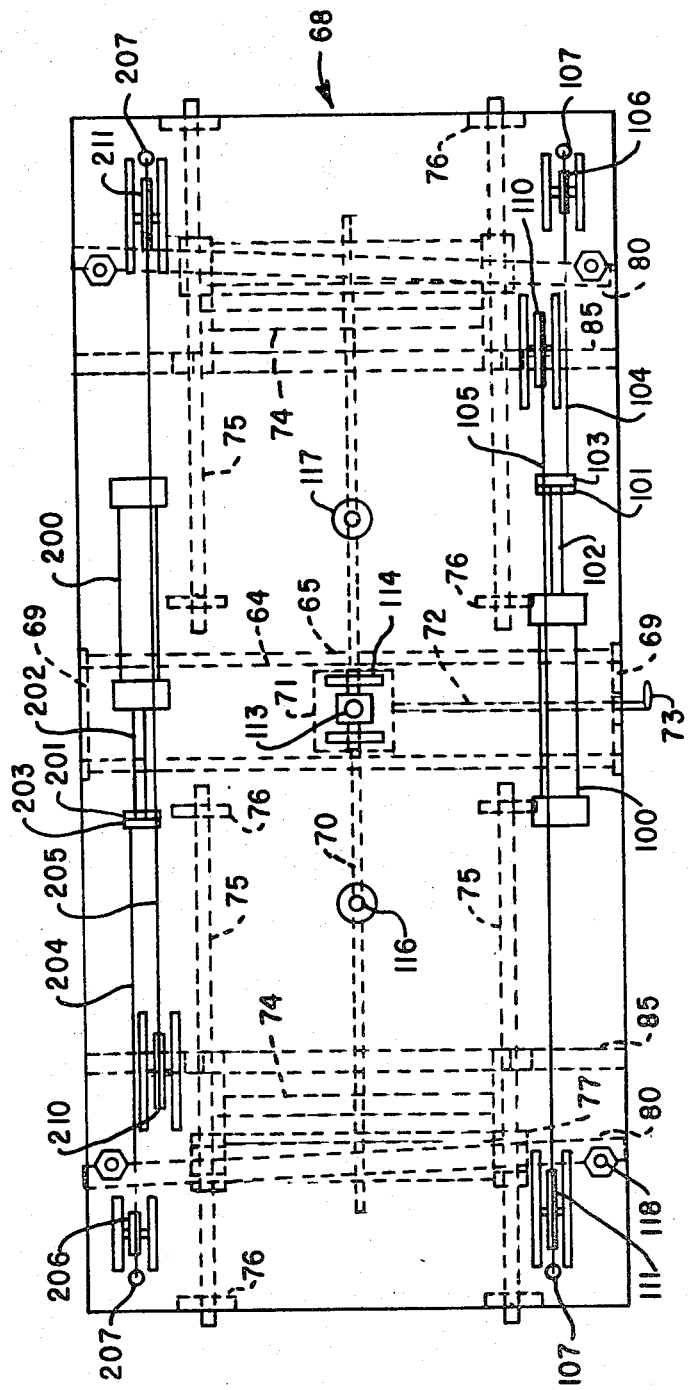
FIG. 3 is a plan view along the line 3—3 of FIG. 2 of a rigid support plate that supports means for deforming the deformable vacuum mold along its longitudinal dimension by different degrees of deformation on opposite sides of its longitudinal center line, showing in phantom how reinforcing bars adjustably supported by the rigid support plate can be oriented obliquely to develop local complications in shape in the distorted vacuum mold.

The reinforcement plate 68 (FIG. 3) supports a pair of piston cylinders 100 and 200 extending longitudinally in opposite directions on each side of its longitudinal center line. Each piston 100 and 200 is provided with a piston rod 102 and 202, respectively. The pistons 100 and 200 are arranged to actuate piston rods 102 and 202 simultaneously in opposite directions. Adjustable stop members 101 and 201 that are readily accessible for adjustment of their positions on top of reinforcement plate 68 are provided to control the maximum displacement of the respective piston rods 102 and 202.

Figure 2:
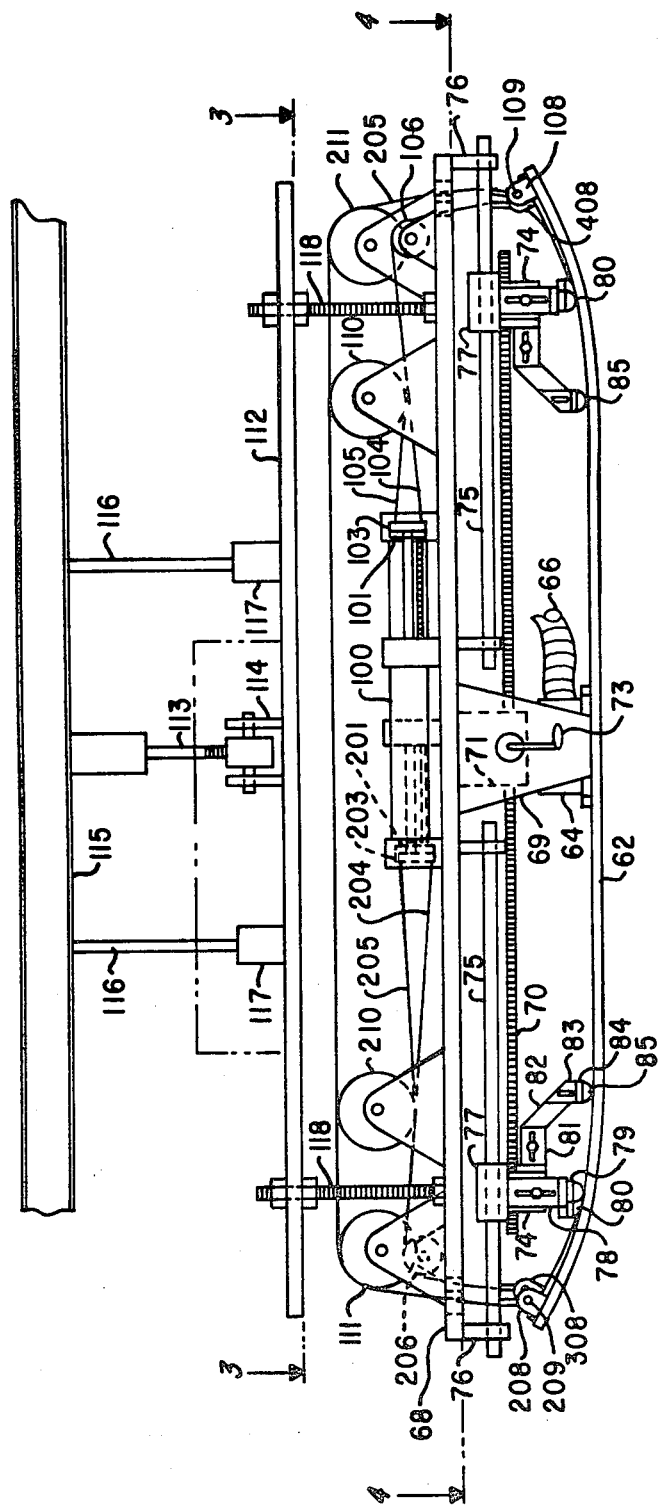
FIG. 2 is a longitudinal elevational view of the vacuum mold of the present invention in its distorted state.
Figure 4:
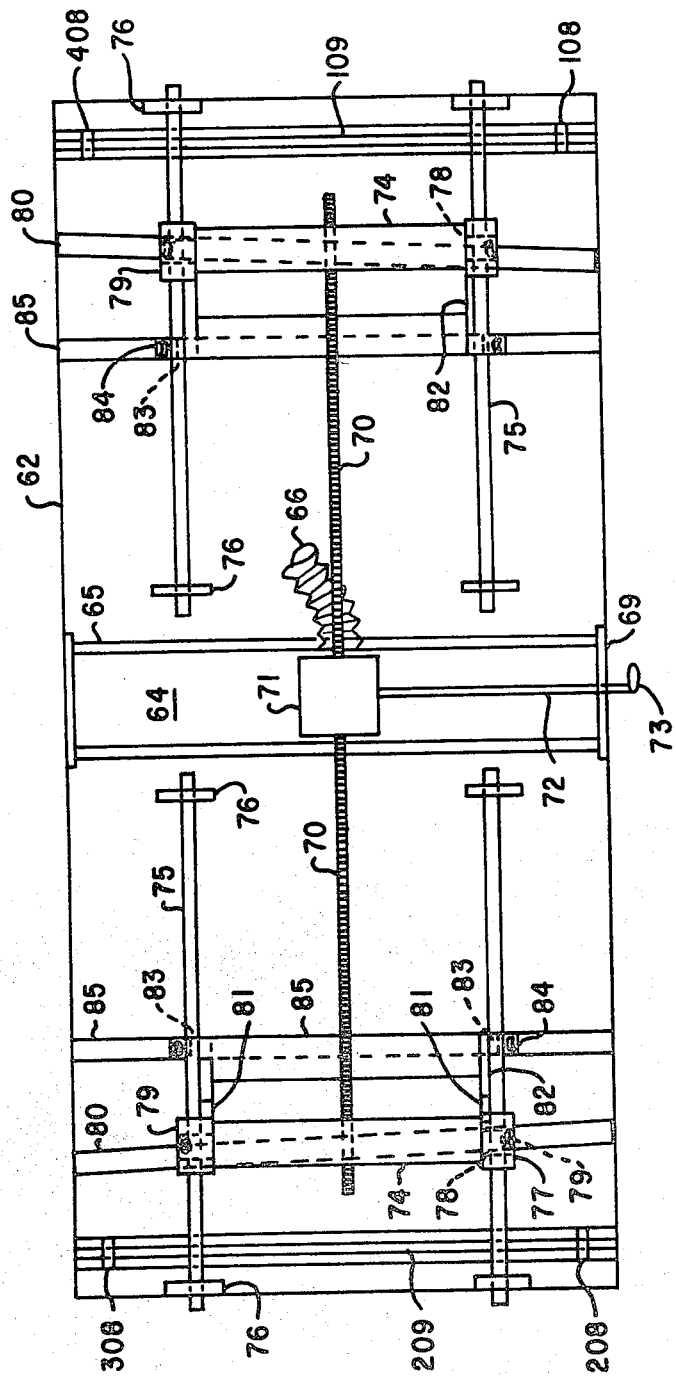
FIG. 4 is a plan view of the vacuum mold in its relaxed state taken along the line 4—4 of FIG. 2 to show how the reinforcing bars of FIG. 3 are arranged over the deformable vacuum mold in easily accessible positions for rapid adjustment to provide localized control for the shape of the vacuum mold when the latter is deformed.

The outer ends of piston rods 102 and 202 contain respective cross bars 103 and 203 to which are attached a pair of cables 104 and 105 for cross bar 103 and cables 204 and 205 for cross bar 203. The cable 104 is entrained about a pulley 106 and extends therefrom obliquely downward and longitudinally outward through an opening 107 in the reinforcement plate 68 and has an end attached to one side of a reinforcement bar 109 near a first bracket 108 near one corner portion of deformable vacuum mold 62 (FIGS. 2 and 4). The bar 109 extends transversely near one longitudinal end of and is fixed through brackets 108 and 408 to the upper flexible sheet of the vacuum mold 62. Cross bars 103 and 203 engage adjustably positioned stop members 101 and 201 to limit the displacement of the associated piston rods 102 and 202.

The other cable 105 from cross bar 103 is mounted around a reversing pulley 110 and continues around a second pulley 111 and extends therefrom obliquely downward and longitudinally outward through another opening 107 in the reinforcement plate 68 toward a second reinforcement bar 209 to which it is attached near a second bracket 208. The reinforcement bar 209 is attached to a third bracket 308 which, like second bracket 208 is fixed to the upper flexible sheet of the deformable vacuum mold 62 adjacent its opposite longitudinal end from the first longitudinal end containing brackets 108 and 408.

On the other side of the reinforcement plate 68, cable 204 extends from cross bar 203 and is entrained about a pulley 206 and extends therefrom obliquely downward and longitudinally outward through an opening 207 in reinforcement plate 68 onto the second reinforcement bar 209 near the third bracket 308.

The other cable 205 from cross bar 203 is mounted around a reversing pulley 210 and continues around a second pulley 211 and extends therefrom obliquely downwardly and longitudinally outward through another opening 207 in the reinforcement plate 68 toward the first reinforcement bar 109 near the fourth bracket 408 which attaches the reinforcement bar 109 to deformable vacuum mold 62. The fourth bracket 408 is connected to the first reinforcement bar 109 at the opposite end from bracket 108.

The piston rods 102 and 202, the cables 104, 105, 204 and 205, the pulleys 106, 110, 111, 206, 210 and 211, the brackets 108, 208, 308 and 408, and the reinforcement bars 109 and 209 comprise mold lifting means to lift the longitudinal end portions of the deformable vacuum mold 62 relative to the mold stiffening structure 65.

It is thus seen that, when the piston rods in cylinders 100 and 200 operate in unison to retract cross bars 103 and 203 different distances, that the reinforcement bars 109 and 209 are caused to lift upward and inward toward the respective pulleys 106, 111, 206 and 211 and cause the vacuum mold 62 to be deformed about its transverse center line different amounts on each longitudinal side of its longitudinal center line. The vacuum mold 62, supported in its central portion beneath the inverted keystone shaped plates 69 and reinforced by mold stiffening structure 65, resists deformation in its central portion and is deformed symmetrically relative to a transverse axis passing across the geometric center of the vacuum mold 62 also termed the transverse center line, and to different degrees on the opposite sides of a longitudinal axis passing through the geometric center of the vacuum mold 62, also termed the longitudinal center line.

If it is desired to have the vacuum mold 62 deform into a complicated shape that varies to an even greater degree from a symmetrical shape about its longitudinal center line, the rigid outer bars 80 and the rigid inner bars 85 are oriented in transverse directions in horizontal planes higher than the plane along which the center portion of the upper wall of the vacuum mold 62 engages the mold stiffening structure 65 and the keystone shaped plates 69 so that the cables moving with the piston rods lift the outer portions of the mold 62 to a higher level than the horizontal planes at which the rigid inner bars 85 and the rigid outer bars 80 are supported. When the piston rods 102 and 202 are extended, the vacuum mold 62 resumes its unstressed flat lengthwise configuration.

The degree of asymmetry of the deformation of the vacuum mold about its longitudinal center line is a function of the difference in displacement of piston rods 102 and 202 and the positioning and orientation of the rigid bars 80 and 85 relative to the bottom of the keystone shaped plates 69 and mold stiffening structure 65.

The reinforcement plate 68 is rigidly connected in spaced relation to a mounting plate 112 (FIGS. 1 and 2).

The latter moves in unison with the reinforcement plate 68 and the vacuum mold 62 in response to actuation by an upper piston 113. The latter is connected through a pivotable coupling 114 at its lower end to the mounting plate 112 and its housing is attached rigidly at its upper end to an overhead support 115. Vertical posts 116 extend upward from sleeves 117 fixed to the mounting plate 112 to guide the mounting plate 112. the reinforcement plate 68 and the deformable vacuum mold box 62 for movement in a vertical direction. Externally threaded bolts 118 extend upward from each corner portion of the reinforcement plate 68 to the mounting plate 112 to attach the plates in vertically spaced relation as seen in FIGS. 1 and 2.

The sheet transfer means 47 comprises a ring-like member 119 (FIG. 1) conforming in elevation and plan outline to the shape desired immediately inward of the peripheral edge of a glass sheet to be shaped at the shaping station 43. The ring-like member 119 is surrounded by a reinforcement frame 121 suitably interconnected thereto. The ring-like member has an upper edge surface that is notched or serrated to minimize contact with the glass and preferably is constructed in the manner of U.S. Pat. No. 3,973,943 to Samuel L. Seymour, the disclosure of which is incorporated herein by reference. The reinforcement frame 121 is connected to a carriage 46 which is constructed to move along the length of spaced transfer rails 45 between a position immediately beneath the vacuum mold 62 and above the lifting mold 50 when the molds are separated and a position within a cooling station (not shown).

The throws of the piston rods 102 and 202 are separately adjustable by changing the positions of adjustable stops 101 and 201, and both piston rods are actuated in unison. This feature enables the piston rods 102 and 202 to act in unison to distort the longitudinally extending halves of the deformable vacuum mold 62 on opposite sides of the longitudinal center line to different degrees of deformation. The orientations of rigid outer bars 80 and rigid inner bars 85 determines the angularity of the axes of bending of the deformable vacuum mold 62 in different localized regions. Their vertical positions relative to one another and the centrally disposed mold stiffening structure 65 determine the shape of different portions along the length of the mold 62. The simultaneous lifting forces applied to reinforcement bars 109 and 209 by actuation of each piston rod 102 and 202 causes the vacuum mold 62 to distort symmetrically relative to its transverse center line. This is an important feature in shaping glass sheets to complicated backlight patterns desired by customers.

Cycle of Operation

A plurality of glass sheets is conveyed through the furnace 42 while supported on the rotating furnace rolls 48. When a glass sheet is sensed by sensing element S1, the rolls 48 in the exit section of furnace 42 accelerate. The glass sheet passes sensing element S2 when the apparatus elements of the illustrative embodiment are in position ready to begin a shaping cycle.

The sensing element S1 controls a high speed run out section which incorporates certain furnace conveyor rolls 48 and sensing element S2 controls the rotation of the additional conveyor rolls 49 in the shaping station 43 to have the rolls 49 stop when the glass sheet reaches a position in alignment immediately above the lifting mold 50. The piston 56 is in its downwardly retracted position when the sheet arrives at shaping station 43, while the upper piston 113 supports the vacuum mold 62 in an initially unstressed condition so that its lower flexible apertured wall is a short distance above the plane of flat glass support defined by the common upper tangent for conveyor rolls 49. It is understood that the flexible vacuum mold 62 may be distorted transversely as well as longitudinally. The lifting mold 50 is initially located beneath the conveyor rolls 49 and the longitudinally unstressed vacuum mold 62 is arranged in spaced relation slightly above the arriving flat glass sheet G to provide clearance for the latter to enter the shaping station 43 at the start of a shaping cycle.

In the second step of the shaping operation, the glass sheet G is lifted by the lifting mold 50 so that it is supported completely above the support plane provided by the conveyor rolls 49 and has sagged at least part way toward the transversely curved configuration of the transverse shaping members 52. At this stage of the shaping cycle, vacuum is applied to the deformable vacuum mold 62 to engage the glass sheet G by vacuum against the lower apertured wall of the deformable vacuum mold.

Subsequently, the vacuum mold 62 is distorted longitudinally about its transverse axis by actuating the piston rods 102 and 202 in piston cylinders 100 and 200 to move different distances inwardly simultaneously to positions controlled by adjustable stops 101 and 201 while upper piston 113 lifts the deformable vacuum mold 62. The vacuum holding the glass sheet against the lower surface of the deformable vacuum mold 62 is maintained and, simultaneously, the lifting mold 50 begins to retract downwardly. The heat softened glass sheet changes shape in response to the complicated change of shape of the vacuum mold 62 produced by simultaneously actuating piston rods 102 and 202 in the controlled manner just described.

It is understood that if the rigid outer bars 80 and rigid inner bars 85 are omitted, the reinforcement bars 109 and 209 will lift upward relative to the horizontal plane common to the stiffening members 65 and keystone shaped plates 69 by equal amounts when piston rods 102 and 202 travel equal inward distances within piston cylinders 100 and 200 simultaneously. When the piston rods are controlled by stops 101 and 201 to move different distances inward of their respective piston cylinders, the longitudinal side edge of the deformable vacuum mold 62 that is distorted by piston rod 102 acting through cables 104 and 105 will be lifted a different amount relative to the horizontal plane common to the stiffening structure 65 and the bottom surfaces of keystone shaped plates 69 than the opposite longitudinal side edge distorted by piston rod 202 acting through cables 204 and 205. In such a case, while the resulting forces distort the deformable vacuum mold symmetrically about its transverse center line, the distortion is gradual in a longitudinal direction from the longitudinal center to each end and asymmetrical on opposite sides of the longitudinal center line of the deformable vacuum mold 62. A heat softened glass sheet engaged by vacuum against the deformable vacuum mold develops the distorted shape of the vacuum mold.

For relatively simple shapes in which the glass sheet is bent at a relatively large radius of bend about its transverse axis and then at a single sharp bend on each side of the transverse axis across the geometrical center of the sheet, one of each pair of the reinforcing bars can either be omitted or retracted to positions that do not engage the deforming mold, and a single reinforcing bar engages each half of the deformable vacuum mold and extends parallel to the transverse axis of the mold to reinforce the mold at approximately the line of sharp bending for that half mold. The single reinforcing bars engaging each half mold are located in a common horizontal plane above the common horizontal plane of the mold stiffening structure 65 and the bottom surfaces of the keystone shaped plates 69 that abut the central portion extending transversely across the entire width of the upper flexible wall of the deformable vacuum mold. Thus, when the piston rods 102 and 202 move different distances, they cause the vacuum mold 62 to deform at a gentle curvature between a transverse vertical plane connecting the stiffening structure 65 and each transverse vertical plane intersecting the reinforcing bar, and to deform the vacuum mold relatively sharply about each reinforcing bar to form end portions or ears that extend obliquely upward longitudinally beyond their lines of engagement with the reinforcing bars. The obliquity of the angle of deformation of each end portion depends on the relative displacements of the piston rods 102 and 202 on the corresponding sides of the longitudinal center line for the deformable vacuum mold.

In the specific embodiment illustrated, the rigid inner bars 85 are oriented approximately normal to the longitudinal center line of the deformable vacuum mold and are supported in a horizontal plane slightly above that occupied by the stiffening structure 65 and the lower walls of the keystone shaped plates 69. The rigid outer bars 80 are oriented obliquely along diverging lines in a horizontal plane higher than the horizontal plane occupied by the rigid inner bars 85. Thus, when the piston rods 102 and 202 are moved inward of their respective cylinders 100 and 200 over different distances, the central portion of the deformable vacuum mold deforms slightly between the keystone shaped plates 69 and the inner rigid bars 85 about axes approximately normal to the length of the vacuum mold, thence at a controlled rate of change about axes that are gradually more oblique in the longitudinally outward direction from the rigid inner bars 85 to the rigid outer bars 80 and have the opposite side corners lifted different distances to develop a complicated shape conforming to that desired for the glass sheets.

Whenever sheets are bent to shapes that depart from the desired pattern beyond the limits specified, it is a simple matter to adjust the position and orientation of the rigid inner bars 85 and/or rigid outer bars 80 that control the localized shape in the portion of the bend that requires correction. Space is provided for easy access to the connections at the various slots of the slotted bars and flanges that control the positioning and orientation of the rigid bars 80 and 85 relative to the housing 74 so that any connection can be loosened to allow changing the position and/or orientation of a rigid bar and, after correcting its position and/or orientation, the loosened connection can be tightened again with the rigid bar in a position and/or orientation that controls a shaping conforming more closely to the desired pattern.

Having the slotted connections readily available in the space between the upper wall of the deformable vacuum mold and the lower surface of the reinforcement plate 68 facilitates any adjustment needed. This is a much simpler technique than replacing one cam with another whenever the shape imparted to a deformable vacuum mold changes beyond the limits permitted by customer specifications for the pattern in question or when a pattern is changed.

It is understood that the inner or outer rigid bars may be adjusted in vertical position to such and extent that they are recessed upwardly from the upper wall of the deformable vacuum mold during its deformation so that the vacuum mold may only engage either one pair of outer rigid bars or inner rigid bars, but not both, if the bend required for the glass sheet is relatively simple. Furthermore, the orientation of both inner and outer rigid bars may be made oblique with the same or different obliquities in plan. It is also understood that the rigid bars may be adjusted to extend obliquely in vertical planes that extend either normal or oblique in plan relative to the longitudinal center line of the deformable vacuum mold as required for different patterns.

In addition, the pairs of rigid bars 80 and 85 may be adjusted to extend parallel to one another at different heights above the position occupied by the bottom of the keystone shaped plates 69 to enable the apparatus to develop a complicated shape having different radii of curvature at different distances from the transverse center line of the deformable vacuum mold. The inner rigid bars 85 are equidistant from the transverse center line along their length and the outer rigid bars 80 are equidistant from the corresponding inner rigid bars 85 on each longitudinal side of the transverse center line. The vertical positions of the inner rigid bars 85 are in a first horizontal plane slightly above the bottom of the keystone shaped plates to define therewith a relatively large radius of curvature while the outer rigid bars 80 occupy a second horizontal plane above the first horizontal plane by a distance sufficient to define a smaller radius of curvature. The distances the piston rods 102 and 202 move are such as to lift the ends of the deformable vacuum mold a desired distance over the second horizontal plane to define the shape of the mold ends.

When the vacuum mold 62 is lifted fully upward and the lifting mold 50 has been fully retracted downwardly, the sheet transfer means 47 is able to enter the space between the lifted vacuum mold 62 and the lowered lifting mold 50. The sheet transfer means 47 moves into a position below the deforming vacuum mold. For shapes of lesser depth, no vertical movement may be needed of the vacuum mold 62 to require this clearance.

The vacuum is then discontinued, so that the glass sheet drops onto the sheet transfer means 47 to have its perimeter conform to the peripheral shape of the ring-like member 119 of the transfer means. The transfer means then supports the shaped glass sheet now shaped to a complicated shape defined by the peripheral shape of the ring-like member. The supported shaped glass sheet moves into a cooling station where the glass sheet supported on the transfer means 47 is reciprocated while cold tempering medium, such as cold air blasts under pressure, are applied against the upper and lower surfaces of the supported glass sheet to impart a desired degree of temper. The sheet transfer means is then unloaded to remove the tempered glass sheet and, if time allows, the transfer means is returned to a parking station in the vicinity of the shaping station 43 to await the completion of the next bending cycle. The piston rods 102 and 202 in piston cylinders 100 and 200 are actuated to relieve the stress applied to the flexible vacuum mold 62 to enable the vacuum mold to assume its unstressed configuration. The upper piston 113 is extended to lower the vacuum mold into its lower position to await the arrival of the next glass sheet at the shaping station 43.

The apparatus is now ready for another shaping cycle.

The present invention makes possible the shaping of glass sheets to complicated shapes of various configurations. It is also suitable for adjustment to produce simple bends by eliminating the engagement of certain or all of the rigid bars and by changing the difference in displacement of the piston rods.

Typical parts produced on apparatus conforming to this invention are backlights having depths of bend as much as 6 inches (15.24 centimeters) for cylindrical bends and depths of bend as much as 3½ inches (8.9 centimeters) for compound bends and bends varying from side to side by approximately 1 inch (2.54 centimeters) in depth of bend.

The form of the invention shown and described in this disclosure represents an illustrative preferred embodiment thereof. It is understood that the gist of the invention is defined in the claimed subject matter which follows and that various modifications of this invention which become obvious in the light of a reading of the description of this specification are incorporated therein.

We claim:

1. A deformable vacuum mold for use in shaping heat softened glass sheets comprising an upper flexible wall and a lower apertured flexible wall defining the ceiling and floor of said mold, a mold reinforcing bar extending transversely of and attached to each of a pair of opposed end portions of said mold, a mold stiffening structure reinforcing the central portion of said mold intermediate said end portions and engaging said upper flexible wall, means to lift said mold reinforcing bars in unison relative to said mold stiffening structure to distort said mold, said lifting means comprising means to selectively lift an end portion of each of said reinforcing bars on one side of a first center line of said vacuum mold a first predetermined distance and means to lift the opposite end portion of each of said reinforcing bars a second predetermined distance different from said first predetermined distance, whereby when said lifting means is actuated, said deformable vacuum mold is bent asymmetrically about said first center line and symmetrically about a second center line transverse to said first center line.

2. A mold as set forth in claim 1, further including a rigid reinforcement plate spaced upward from said deformable vacuum mold for supporting said lifting means, at least one rigid bar supported below said reinforcement plate between said mold stiffening structure and each of said reinforcing bars at an elevation higher than the elevation at which said mold stiffening structure engages said deformable vacuum mold and extending in a direction transverse to the first center line of said deformable vacuum mold, whereby said lifting means causes the vacuum mold to bend about each of said rigid bars when said lifting means lifts the reinforcing bars in unison to deform said vacuum mold.

3. A mold as set forth in claim 2, wherein said at least one rigid bar comprises one of a plurality of rigid bars supported below said reinforcement plate between said mold stiffening structure and each of said reinforcing bars, at least one of said plurality of rigid bars on each side of said mold stiffening structure being located along a curved surface conforming to the shape desired for the deformed vacuum mold.

4. A mold as set forth in claim 2, comprising a housing fixed to said rigid reinforcement plate on each side of the second center line of said deformable vacuum mold for supporting one or the other of said rigid bars, means located in readily accessible positions below said rigid reinforcement plate to adjust the horizontal and vertical position of each said rigid bar relative to said deformable mold and means to adjust the orientation of each said rigid bar relative to said rigid reinforcement plate.

5. A mold as set forth in claim 3, comprising a housing fixed to said reinforcement plate on each side of the second center line of said deformable vacuum mold for supporting each of said plurality of said rigid bars, means located below said rigid reinforcement plate to adjust the horizontal and vertical positions of each of said plurality of said rigid bars relative to said deformable mold, and means to adjust the orientation of each of said plurality of rigid bars relative to said deformable mold.

6. A mold as set forth in claim 4, wherein said housing is connected to a pair of vertically slotted members to adjustably secure the vertical position of said rigid bar relative to said deformable vacuum mold, a horizontal flange member having an arcuate slot is fixed to each said vertically slotted member to control the orientation of said rigid bar relative to said deformable vacuum mold and means is provided to adjust the position of each said housing relative to said deformable vacuum mold to adjust the horizontal position of said rigid bar associated with said housing.

7. A mold as set forth in claim 1, wherein said lifting means comprises a pair of pistons each having a piston rod on one or the other side of the first center line of said deformable vacuum mold, each piston rod provided with a pair of cables entrained about pulleys to connect with an individual end portion of each reinforcement bar for each cable, and means to limit the displacement of each said piston rod.

8. A deformable vacuum mold for use in shaping heat softened glass sheets comprising an upper flexible wall and a lower, apertured flexible wall defining the ceiling and floor of said mold, a rigid reinforcement plate in vertically spaced relation to said mold forming a vertical space therebetween, a centrally disposed mold stiffening structure engaging the central portion of said vacuum mold to reinforce the latter at a given level, means engaging the opposite longitudinal end portions of said deformable vacuum mold, lifting means adapted to actuate said end portion engaging means to lift the deformable mold at its longitudinal end portions above said given level, rigid bar means supported by said rigid reinforcement plate and extending transversely between each said longitudinal end portions and said mold stiffening structure in adjustable positions within said vertical space, and means for adjusting the horizontal and vertical positions of said transversely extending bar means within said vertical space and for adjusting the orientation of said bar means within said vertical space so that at least selected ones of said bar means engage said deformable mold when said lifting means actuate said end portion engaging means to provide localized control for the shape imparted to said deformable mold during said lifting.

9. A deformable vacuum mold as set forth in claim 8, wherein said lifting means is constructed and arranged to lift the transversely opposite end portions of said deformable mold different distances on opposite sides of its first center line to engage the opposite ends of said transversely extending bar means.

10. A method of bending a glass sheet to a desired shape that is symmetrical about a first center line and asymmetrical about a second center line transverse to the first center line, comprising heating said glass sheet to its deformation temperature, engaging said glass sheet while at said deformation temperature by suction against a horizontally oriented deformable vacuum mold, supporting a transversely extending bar above said mold between said first center line and each end portion of the mold, along lines non-parallel to said first center line, selectively lifting opposite end portions of said mold relative to said second center line so that the mold engages said bars and the two end portions of said mold to one side of the first center line are lifted a first predetermined distance and the two end portions of said mold to the other side of said first center line are lifted a second predetermined distance different from said first predetermined distance before the glass sheet cools to below said deformation temperature to bend the glass sheet to said desired shape.

11. A method as set forth in claim 10, further including engaging the central portion of said mold against mold stiffening structure to stiffen said deformable mold in said central portion.

12. A method as set forth in claim 11, further including engaging the top of said deformable mold across its width by two rigid bars between said mold stiffening structure and said points of application of said lifting force.

13. A method as set forth in claim 12, wherein at least one of said rigid bars on each side of said mold stiffening structure engages the top of said deformable mold along an oblique line of engagement.

* * * * *